(12) United States Patent
Dalia

(10) Patent No.: US 10,223,683 B1
(45) Date of Patent: Mar. 5, 2019

(54) VERSATILE TRANSACTION SCANNER FOR USE IN A FOOD AND BEVERAGE VENUE

(71) Applicant: Saverio Dalia, Staatsburg, NY (US)

(72) Inventor: Saverio Dalia, Staatsburg, NY (US)

( * ) Notice: Subject to any disclaimer, the term of this patent is extended or adjusted under 35 U.S.C. 154(b) by 0 days.

(21) Appl. No.: 15/831,827

(22) Filed: Dec. 5, 2017

(51) Int. Cl.
| | |
|---|---|
| *G06F 7/08* | (2006.01) |
| *G06Q 20/20* | (2012.01) |
| *G06Q 20/26* | (2012.01) |
| *G06Q 30/06* | (2012.01) |
| *G07G 1/00* | (2006.01) |
| *G06Q 20/32* | (2012.01) |
| *G07F 7/08* | (2006.01) |
| *B67B 7/16* | (2006.01) |

(52) U.S. Cl.
CPC ........... *G06Q 20/208* (2013.01); *G06Q 20/26* (2013.01); *G06Q 20/32* (2013.01); *G06Q 30/0601* (2013.01); *G07F 7/08* (2013.01); *G07G 1/0081* (2013.01); *B67B 7/16* (2013.01)

(58) Field of Classification Search
CPC .......... G07F 7/08; G07F 7/025; G06Q 20/342
USPC ........................................................ 235/381
See application file for complete search history.

(56) References Cited

U.S. PATENT DOCUMENTS

| | | | | |
|---|---|---|---|---|
| 9,117,231 B2* | 8/2015 | Rodgers | ................. | G06Q 30/06 |
| 9,317,846 B2* | 4/2016 | Baldwin | ............. | G06Q 20/204 |
| 2012/0005076 A1* | 1/2012 | Dessert | .................. | G06Q 20/10 |
| | | | | 705/39 |
| 2013/0144731 A1* | 6/2013 | Baldwin | ................ | G06Q 20/20 |
| | | | | 705/17 |
| 2015/0199777 A1* | 7/2015 | Rodriguez | ............. | G06Q 50/12 |
| | | | | 705/15 |

\* cited by examiner

*Primary Examiner* — Ahshik Kim
(74) *Attorney, Agent, or Firm* — Goldstein Law Offices, P.C.

(57) ABSTRACT

A versatile transaction scanner for use in a food and beverage venue, comprising an optical reader and a wireless transceiver, which is adapted to read transaction information encoded within a transaction code, and transmit the transaction information to a point of sale system for processing. The transaction scanner can be used by a user who is a venue staff member to scan transaction codes representing new customer orders which are then received by the point of sale system and prepared by the venue. The transaction information may further contain payment information, allowing the transaction to be processed and completed with a single scan. The transaction scanner may further comprise a vibration mechanism which alerts the user when the customer's order is ready to be served. The transaction scanner may also have an integrated bottle opening mechanism, allowing a bartender to simultaneously take beverage orders and open bottle caps.

19 Claims, 8 Drawing Sheets

VERSATILE TRANSACTION SCANNER FOR USE IN A FOOD AND BEVERAGE VENUE

TECHNICAL FIELD

The present disclosure relates generally to a handheld scanning device. More particularly, the present disclosure relates to a transaction scanning device which allows a user who is a staff member in a food and beverage venue to process a transaction by scanning a transaction code.

BACKGROUND

Bars, restaurants, and other food and beverage venues have benefited in recent years from steady improvements in efficiency provided by point of sale systems and computerized ordering systems. The widespread use of smartphones allows venues to provide customers with the ability to place orders via smartphone applications, which are then often processed by the venue as take-out orders. Some venues provide their dine-in customers with tablet computers running menu and ordering applications which allow customers to both place their orders and pay from a tablet.

While these automated menu and ordering systems do allow venues to receive and process orders in a quick and efficient manner, they do have certain inherent disadvantages which cannot be easily overcome through more automation. For example, placing orders electronically reduces the element of human interaction between customers and servers which often forms an important part of the dining experience. Looking beyond table service, the crowded and dynamic environment of a bar or nightclub may nullify the speed gained through electronic ordering as it becomes very difficult for servers and bartenders to associate electronic orders with the customers who placed them. Lastly, even a highly efficient and accurate ordering system at a very busy bar does little to help an overworked bartender who, having only two arms and one set of eyes, cannot monitor orders, take payments, serve drinks to customers, and open bottle caps at the same time. Therefore, a solution is needed which combines the familiarity of personal service and the speed of electronic ordering to address the disadvantages listed above, and which is suitable for both table service and bar and nightclub environments.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a handheld transaction scanner for use by a user who is a staff member in a food and beverage venue, which is capable of processing a transaction by scanning a transaction code. Accordingly, the present disclosure provides a transaction scanner comprising an optical reader and a wireless transceiver. The optical reader is adapted to scan a transaction code implemented as a linear or 2d barcode. Transaction information is encoded within the transaction code, and may contain a list of food and beverage items ordered by a customer, along with payment information. The transaction scanner is adapted to transmit the transaction information to a point of sale (POS) system, which processes the transaction using the payment information.

Another aspect of an example embodiment in the present disclosure is to provide a transaction scanner which allows a bartender to process multiple beverage transactions in quick succession. Accordingly, the present disclosure provides a transaction scanner equipped with an integrated bottle opening mechanism, allowing the bartender to scan transaction codes and open bottle caps without having to put down the transaction scanner or switch to a separate bottle opener.

Yet another aspect of an example embodiment in the present disclosure is to provide a transaction scanner which alerts a user when a customer's order is ready to be served. Accordingly, the transaction scanner may further comprise a vibration mechanism which activates upon the transaction scanner receiving a service request notification from the venue, alerting the user that the customer's food is ready to be served.

Yet a further aspect of an example embodiment in the present disclosure is to provide a transaction scanner which alerts the user to scanning and transmission errors. Accordingly, the transaction scanner may further comprise a status light capable of displaying different patterns of light and/or color to signify an error in scanning a transaction code, or in transmitting transaction information to the POS system.

Yet another aspect of an example embodiment in the present disclosure is to provide a transaction scanner which assists the management of a food and beverage venue in improving operational efficiency within the venue, and in understanding the performance of venue staff as well as identify customer preferences. Accordingly, the transaction scanner may contain a user ID identifying the user, which further associates the user ID with any transactions scanned by the transaction scanner. The transaction scanner can record a transaction log containing the transaction information of each transaction code scanned by the user via the transaction scanner, and may further record an activity log comprising a record of each customer order associated with the user and a customer satisfaction rating for each customer order.

An aspect of an example embodiment in the present disclosure is to provide a method which allows a user who is a staff member in a food and beverage venue to process a customer's order by scanning a transaction code using the transaction scanner. Accordingly, the customer presents the user with a transaction code with transaction information describing the items ordered by the customer as well as payment information. The user scans the transaction code using the transaction scanner, which decodes and transmits the transaction information to the POS system. The POS system processes the transaction by processing the payment information, and the venue prepares the items ordered by the customer. Once the items are ready to be served, the transaction scanner receives a service request notification from the venue, activating the vibration mechanism and alerting the user. The user then serves the customer with the items contained in the customer's order.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
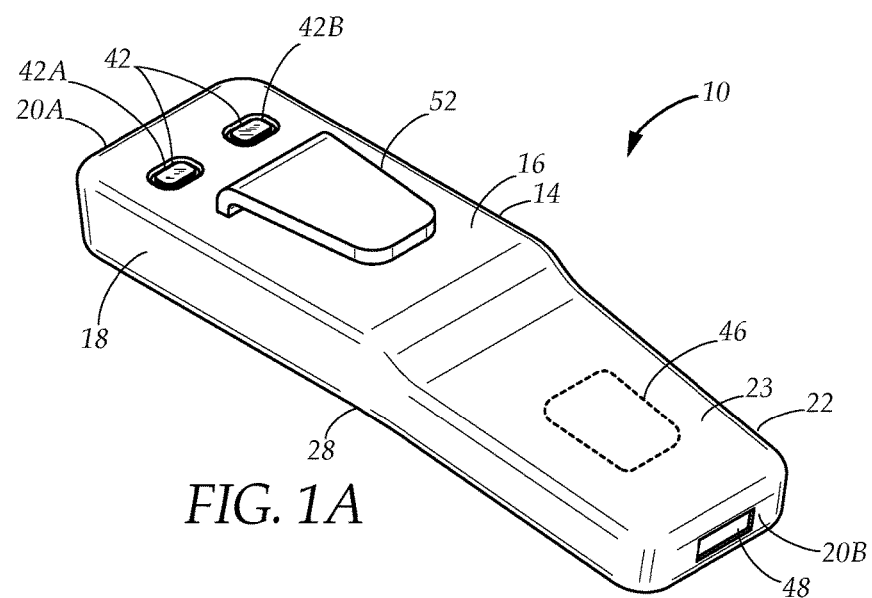
FIG. 1A is a diagrammatical perspective view of an embodiment of a transaction scanner, in accordance with the present disclosure.
Figure 1B:
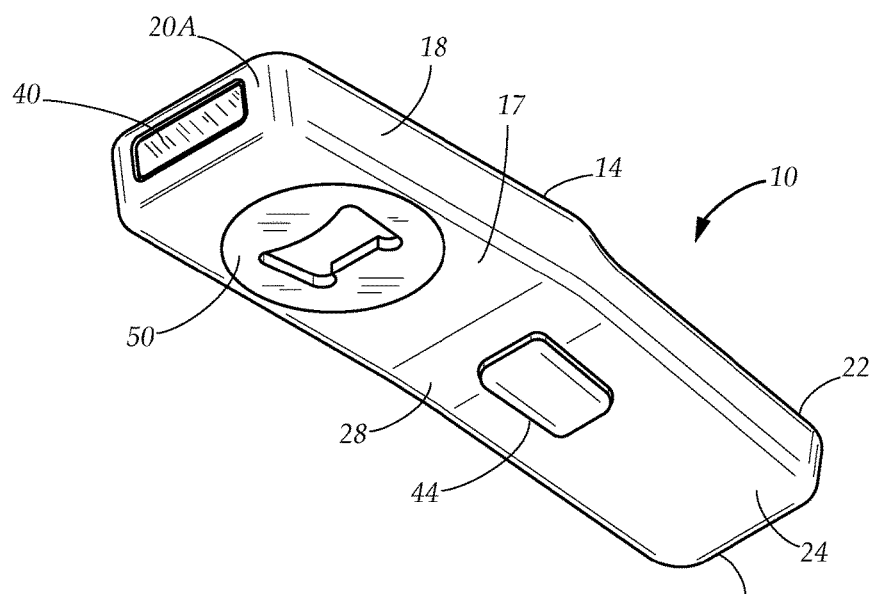
FIG. 1B is a diagrammatical perspective view of the transaction scanner showing an optical scanner, a bottle opener, and activation trigger.

FIGS. 1A-B illustrate an exemplary transaction scanner 10 for use by a bartender in a food and beverage venue environment, such as a bar, restaurant, sporting venue, or other establishment that serves food or beverages. Solely for the purposes of the present disclosure, the term bartender can refer to any venue staff member, such as a server. The transaction scanner 10 constitutes a single device which assists the bartender with a variety of food and beverage service tasks. The transaction scanner 10 comprises an optical reader 40 which scans a transaction code containing transaction information representing a customer order, payment, or other transaction, and further comprises a wireless transceiver adapted to transmit the transaction information to a point of sale (POS) system for further processing, and an activation switch 44 which activates the optical reader 40 when the activation switch is engaged. The transaction scanner 10 is further equipped with a rechargeable battery which powers its functions. The transaction scanner 10 may also comprise a status light 42, which may light up, blink, and/or flash in one or more colors to convey a status indicator to the bartender. In a preferred embodiment, the transaction scanner 10 comprises a first status light 42A and a second status light 42B. Each status light may be implemented using one or more light emitting diodes (LED). The transaction scanner 10 further comprises a vibration mechanism 46 which vibrates upon the transaction scanner receiving a service request notification, alerting the bartender to a service request from a customer or a venue staff member. The vibration mechanism 46 may be configured to vibrate in more than one vibration pattern to differentiate between a customer service request notification and a venue service request notification. The transaction scanner 10 further comprises a bottle opening mechanism 50, allowing the bartender to open beverage bottles with the transaction scanner 10, eliminating the need for the bartender to carry an additional bottle opener. The bottle opening mechanism 50 can be a standard rounded or rectangular device designed to grip and lift bottle caps, claw-type bottle opener, or any type of device commonly employed to remove bottle caps from beverage bottles. The transaction scanner 10 may also comprise an interface port 48 adapted to allow the transaction scanner to communicate with an external system, such as the POS system, via a wired interface, or to receive power input in order to charge the battery. For example, the interface port 48 may be implemented using USB. The transaction scanner 10 can be further adapted to compile and store a transaction log containing details of each transaction scanned by the transaction scanner, and may also compile and store an activity log containing a record of the bartender's activity within the food and beverage venue.

The transaction scanner 10 may be linked to the bartender through a bartender ID stored within the transaction scanner 10. Each bartender may be assigned a unique bartender ID, allowing transactions to be associated with the bartender who processes the transaction, as well as allowing service request notifications to be transmitted to the transaction scanner associated with the correct bartender.

The transaction scanner 10 comprises an outer shell 12, which can be formed as an elongated bar or rod having a front end 20A and a back end 20B. The outer shell 12 can be formed using plastic, aluminum, or other material which is lightweight but durable which would allow the transaction scanner 10 to remain functional when subjected to drops and impacts. The outer shell 12 may be configured to be water-resistant, allowing the transaction scanner 10 to be protected from damage if subjected to splashes or immersion in liquids. The outer shell 12 may also incorporate an outer cushioning layer of soft material such as rubber. The outer shell 12 may be divided between a scanner body 14 oriented towards the front end 20A, along with a grip 22 towards the back end 20B. In a preferred embodiment, the optical reader 40 is disposed on the front end 20A of the transaction scanner 10, while the grip 22 is adapted to serve as a handle, allowing the bartender to grasp the transaction scanner 10 by the grip and point the front end 20A towards the transaction code so it can be scanned by the optical reader 40. Furthermore, the vibration mechanism 46 may be housed within the grip 22, so that the bartender can easily feel the vibration of the vibration mechanism 46 when the transaction scanner receives a service request notification.

The grip 22 may further comprise a grip upper surface 23, and a grip lower surface 24. The activation switch 44 may be positioned on the grip lower surface 24 so that the bartender can press the activation switch 44 to activate the optical reader 40. Alternatively, the activation switch 44 may be positioned on the grip upper surface 23 where it can be pressed by the bartender's thumb. In an embodiment, the back end 20B of the outer shell 12 can have an area that is smaller than the area of the front end 20A, such that the grip gradually tapers towards the back end 20B. The interface port 48 may be positioned near the grip 22 at the back end 20B.

The scanner body 14 may comprise a scanner body upper surface 16 and a scanner body lower surface 17. The first and second status lights 42A, 42B may be positioned on the scanner body upper surface 16 so that the status lights are visible to the bartender while the transaction scanner 10 is in use. In some embodiments, the scanner body may 14 further comprise a pair of side surfaces 18 perpendicularly oriented between the scanner body upper and lower surface 16, 17.

In an embodiment, the back end 20B of the outer shell 12 can have an area that is smaller than the area of the front end 20A, such that the outer shell 12 gradually tapers from the point towards the back end 20B from the point where the grip 22 meets the scanner body 14.

The bottle opening mechanism 50 may be disposed on the scanner body lower surface 17, allowing the bartender to rapidly switch between scanning transaction codes and opening beverage bottles without having to switch to a bottle opener, making the transaction scanner 10 particularly useful in a busy bar environment where the bartender is serving bottled beverages to multiple customers in succession. For example, the bartender may scan one customer's transaction using the transaction scanner 10 his or her right hand, retrieve a bottle with his or her left hand, remove the bottle cap with the bottle opening mechanism 50 disposed on the transaction scanner 10, and serve the opened bottle to the customer. Many customers can be served in quick succession, without requiring the bartender to keep track of each transaction and payment.

The outer shell 12 may further comprise a bend 28 located between the scanner body 14 and the grip 22. The grip 22 may further be positioned at an angle in relation to the scanner body 14, so that the grip lower surface 24 extends away from the bend 28 at a downwards angle in relation to the plane defined by the scanner body lower surface 17. In certain embodiments, the grip 22 may be nearly perpendicular in relation to the scanner body 14.

The transaction scanner 10 may further comprise an attachment mechanism 52 disposed on the outer shell 12. The attachment mechanism 52 can be implemented as a clip which attaches the transaction scanner 10 to a belt or an attachment loop worn by the bartender. The attachment mechanism 52 may also be implemented as a magnetic connector, a lanyard, or other means of ensuring that the transaction scanner 10 is secured to prevent the transaction scanner from being lost or misplaced when not in use.

Figure 2:
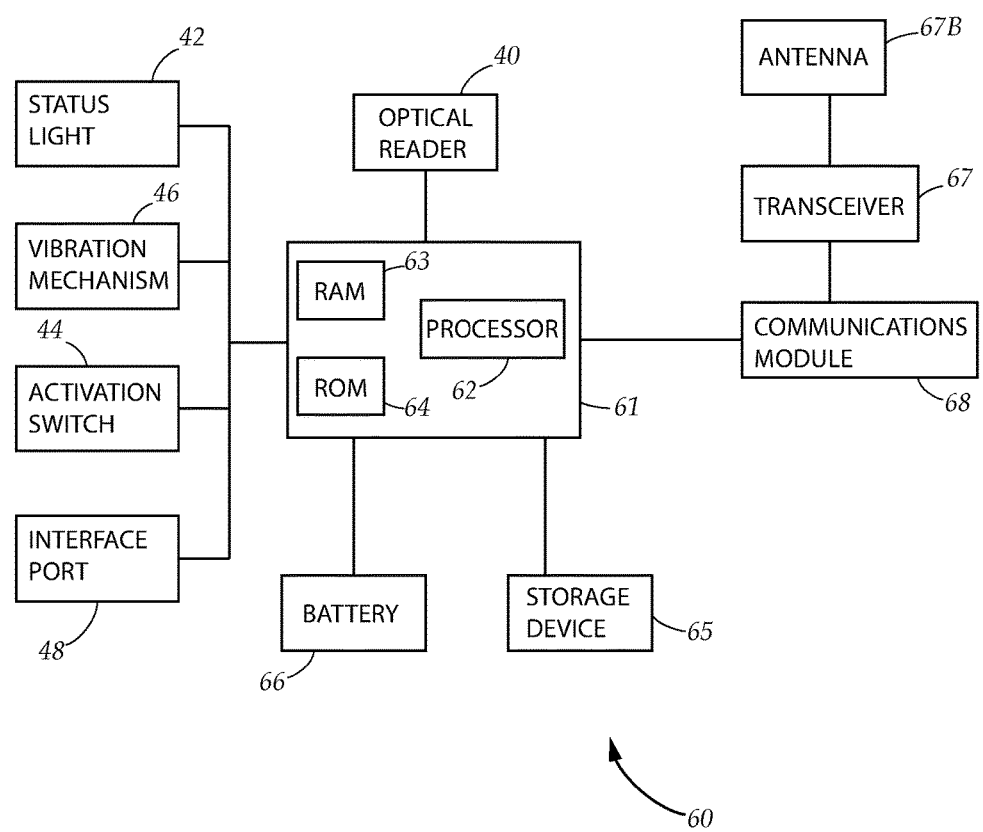
FIG. 2 is a block diagram depicting the configuration of a transaction scanner system, in accordance with the present disclosure.

Referring now to FIG. 2, an exemplary transaction scanner control system 60 is employed to control the functions of the transaction scanner. The transaction scanner control system 60 draws power from the rechargeable battery 66, and comprises a control unit 61 having a processor 62, a RAM 63, and a ROM 64. The control unit is connected to the optical reader 40 and is adapted to receive and decode the transaction information contained in the transaction code. The control unit 61 is connected to a communications module 68 which transmits and receives data via the transceiver 67. The transceiver 67 may be further connected to an antenna 67B. The transceiver 67 may be adapted to communicate using any commonly employed wireless communications technology, such as RF, WIFI, Bluetooth, in order to communicate with external systems employed at the food and beverage venue, such as the POS system, or a paging system, as will be apparent to a person of ordinary skill in the art in the field of the invention. This allows the transaction scanner to transmit transaction information to the POS system, as well as receive service request notifications from the paging system. The control unit may also be connected to the interface port 48 in order to communicate with the POS system or draw power for recharging the battery 66. The control unit 61 is further connected to the status light 42, the vibration mechanism 46, and the activation switch 44. This allows the control unit 61 to activate the optical scanner 40 upon receiving a signal from the activation switch 44, as well as control the status light 42 and vibration mechanism 46. The transaction scanner control system 60 may further comprise a storage device 65 connected to the control unit 61, which can be utilized to store the transaction log or the activity log. The storage device 65 may be implemented using any commonly used storage medium. In alternate embodiments, the transaction scanner may further comprise a speaker for emitting audible tones, which can be connected to the transaction scanner control system 60 to provide feedback to the bartender indicating errors in the scanning process, or to alert the bartender to signal request notifications.

Figure 3:
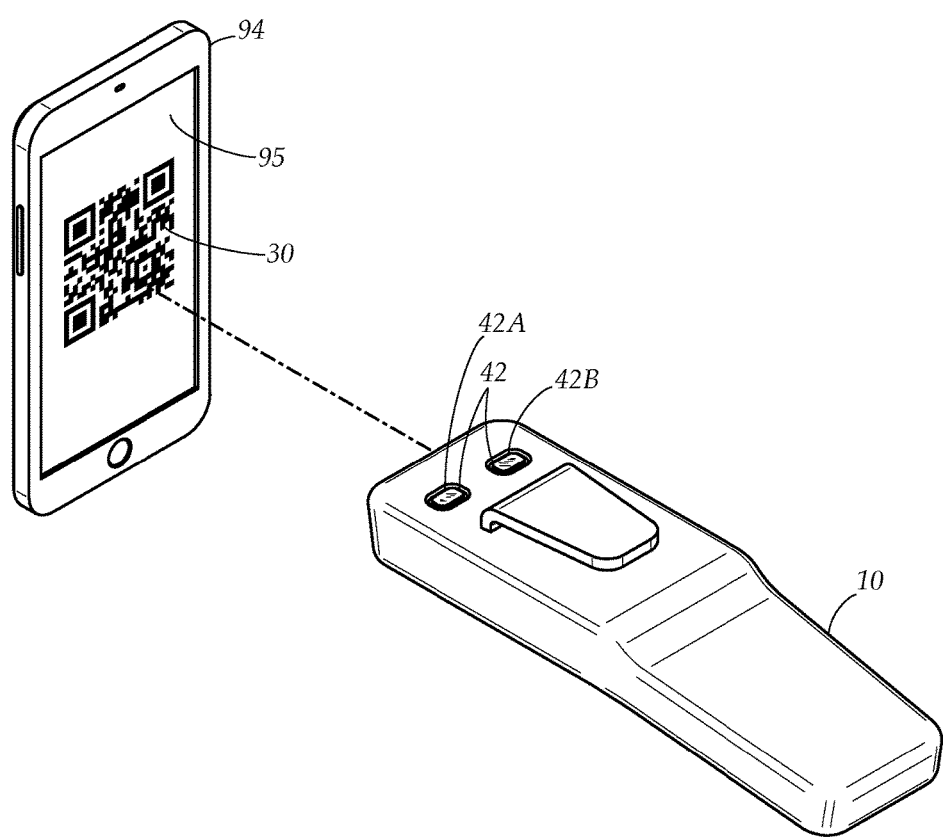
FIG. 3 is a diagrammatical perspective view depicting the transaction scanner scanning a transaction code, in accordance with the present disclosure.

Turning now to FIG. 3, while simultaneously referring to FIGS. 1A-B and 2, the transaction scanner 10 is depicted scanning the transaction code 30. The transaction code 30 may be generated through a variety of means, such as through a menu system employed by the food and beverage venue, and can be printed onto a physical medium such as paper, or presented on a digital display. A customer device 94 comprising a customer device display 95 may also be used to display the transaction code 30. The consumer device 94 may be a portable computing device such as a smartphone or tablet running an application which allows the customer to choose food and beverage items and generate the transaction code 30 for the new customer order. The transaction code 30 encodes transaction information using symbols which are recognized and decoded electronically by the optical reader 40 in conjunction with the control unit 61. The transaction code 30 may be implemented using a variety of optical barcodes, including linear and 2D (matrix) barcodes. In an exemplary embodiment, the transaction code 30 can be a QR Code. The optical reader 40 may be implemented using commonly available LED or laser based barcode reader technology, or can be implemented using a camera which captures an image of the transmission code 30 for further decoding via image analysis. The transaction information contains information related to the customer order, such as a list of food and beverage items ordered, the price for each item, and other relevant information which the food and beverage venue may require to aid in the processing of the customer's order.

The transaction scanner 10 can be configured to process multiple transaction types, and the particular transaction type is indicated in the transaction information encoded into the transaction code 30. The transaction scanner 10 can be customized to read and interpret the transaction codes employed by the POS system within the food and beverage venue, and the transaction information will likewise be structured in a format which is compatible with the POS system of the venue. The transaction code 30 may be an order code which allows the customer to place a new customer order, or a payment code which allows the customer to submit payment for an existing customer order. The transaction code 30 may further represent a modification code for modifying an existing customer order, a cancellation code for cancelling an existing customer order, or a completion code indicating that service for an existing customer order is complete. The transaction code 30 may be further configured to represent yet more transaction types, as will be apparent to a person of ordinary skill in the art in the field of the invention.

Figure 4:
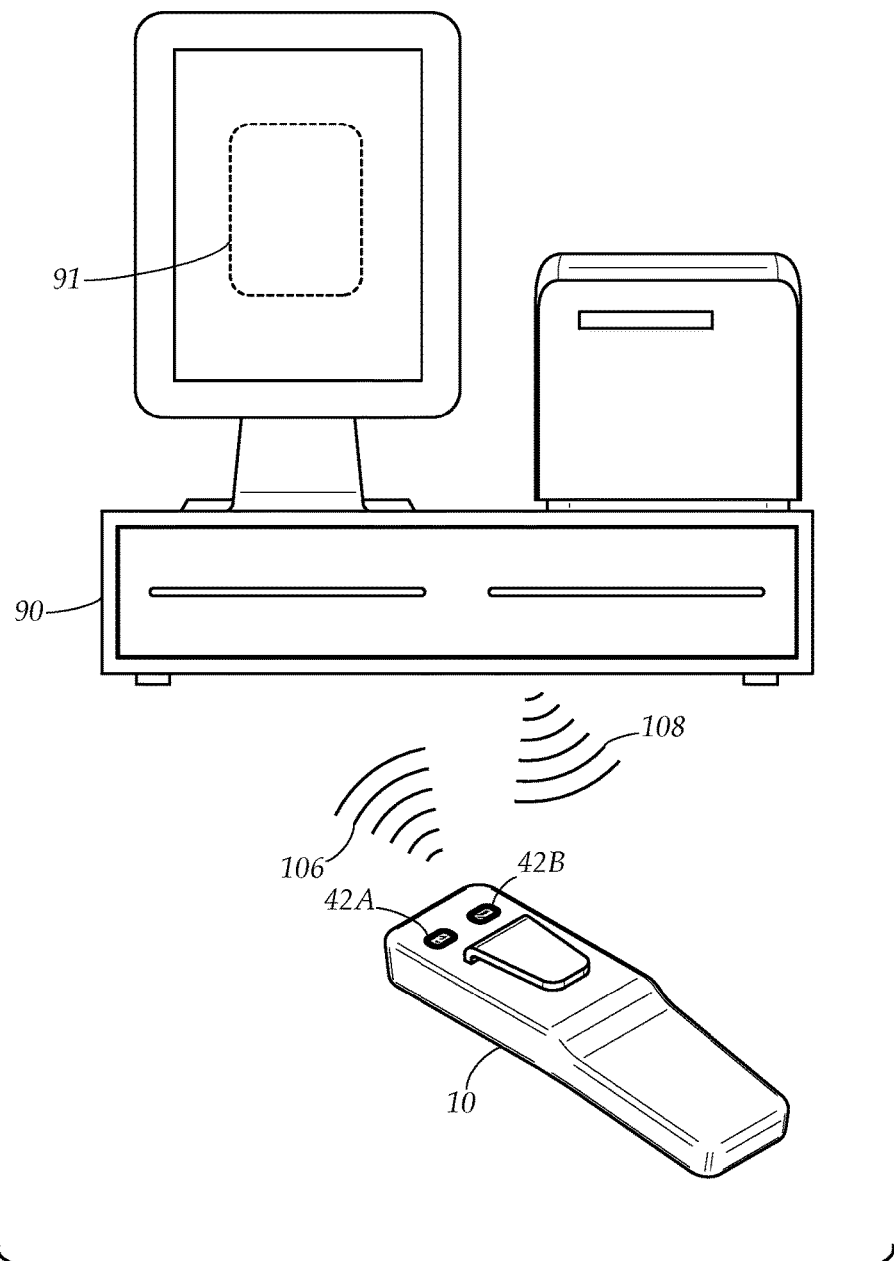
FIG. 4 is a diagrammatical perspective view depicting the transaction scanner interacting with an external system, in accordance with the present disclosure.

In order to scan the transaction code 30, the bartender simply points the optical reader 40 at the transaction code 30 and engages the activation switch 44. The optical reader 40 then activates, scanning the transaction code 30. Turning to FIG. 4 while referring also to FIG. 3, the transaction scanner 10 decodes the transaction information encoded within the transaction code 30, and transmits the transaction information to the POS system 90 via a transaction transmission signal 106. The POS system 90 may also transmit a transaction confirmation signal 108 to the transaction scanner 10, indicating that the transaction information is successfully received by the POS system 90. Once the POS system 90 receives the transaction information, the details of the transaction can be viewed using a POS system interface 91.

Returning now to FIG. 3, while continuing to refer to FIGS. 1A-B and 4, the status light 42 display a certain status indicator pattern which informs the bartender of the current status of the transaction scanner 10. In a preferred embodiment, the first status light 42A and second status light 42B may be unlit when the transaction scanner 10 is inactive. When the optical reader 40 is activated, the first status light 42A may then be lit red to indicate a "scanning" status. When the transaction code 30 is successfully scanned and decoded, the first status light may then be lit green to indicate a "scan successful" status. If the transaction code 30 cannot be scanned, or is invalid, the first status light may blink or flash red, indicating a "scanning failed" status. Next, the transaction scanner 10 may begin to transmit the transaction information to the POS system 90 via the transaction transmission signal 106. The second status light 42B can be lit red to indicate a "transmission pending" status. Once the transaction transmission signal 106 is successfully received by the POS system 90, such as when the transaction scanner 10 receives the transaction confirmation signal 108, the second indicator light 42B may then be lit green, indicating a "transmission complete" status. If the transaction transmission signal 106 cannot be successfully transmitted, or if the POS system transmits a "transaction rejected signal", the second status light may blink or flash red, indicating a "scanning failed" status. Note that this example is non-limiting and other combinations of flashes, blinks, and colors may be used to denote various status indicators, as will be apparent to a person of ordinary skill in the art in the field of the invention. For example, the status light 42 may be capable of being lit in three or more colors, with various transaction types being associated with a different color. Furthermore, additional status lights may be employed beyond the first and second status lights 42A, 42B.

Figure 5:
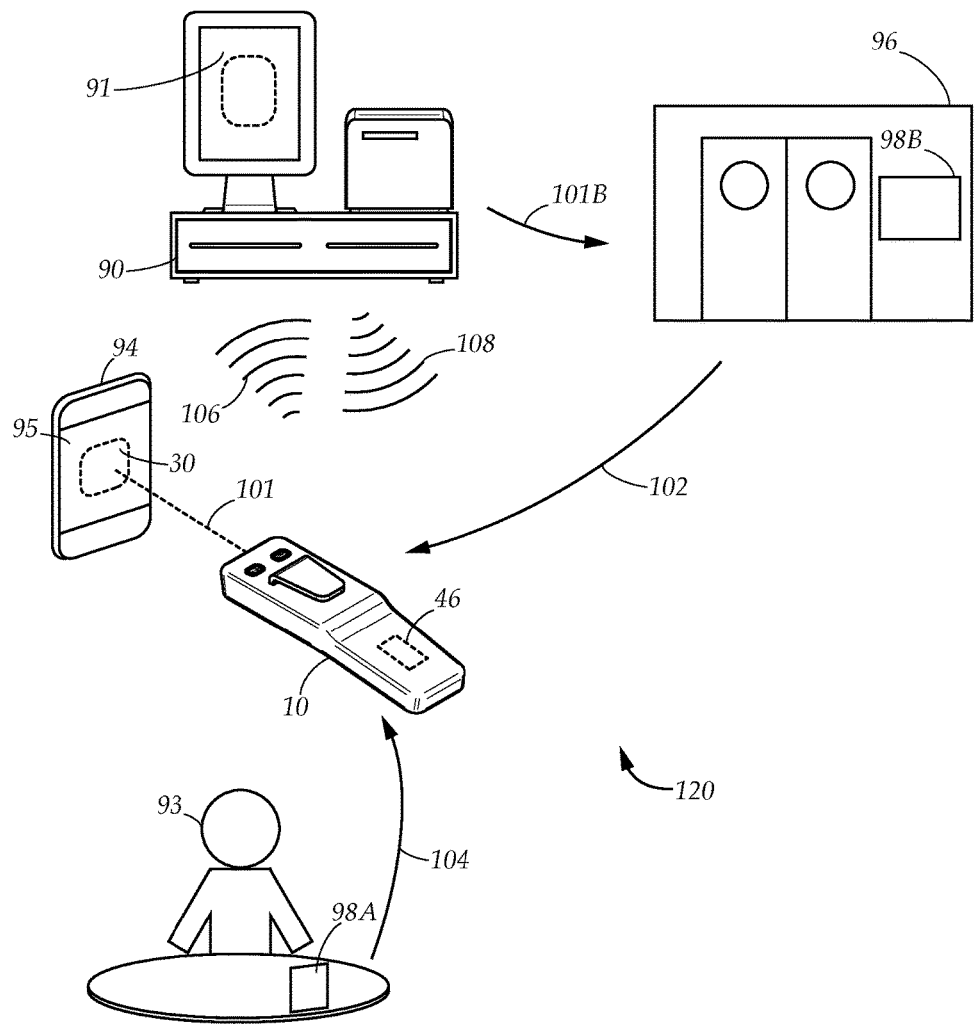
FIG. 5 is a flow chart depicting the flow of communications between the transaction scanner and elements and systems within a food and beverage venue, in accordance with the present disclosure.

Turning now to FIG. 5, the transaction scanner 10 is depicted processing an example transaction within the food and beverage venue 120 equipped with a standard POS system 90. The customer 93 may attract the bartender's attention using a customer paging system 98A. In some embodiments, the customer device 94 may be adapted to function as a customer paging system 98A. The transaction scanner 10 receives the customer service request notification 104 from the customer paging system 98A, and causes the vibration mechanism 46 to vibrate in a first vibration pattern. The bartender approaches the customer 93 and takes the customer's order by using the transaction scanner to scan the transaction code 30 displayed on the consumer device 94. The transaction scanner 10 then transmits the transaction information to the POS system 90 via the transaction transmission signal 106. The POS system receives the transaction information, and transmits the transaction confirmation signal 108 to the transaction scanner 10. The POS system may also communicate the transaction information 101B to the kitchen 96, which prepares the food or beverage items listed in the transaction information. The bartender may then serve other customers or perform other tasks while the kitchen prepares the customer order. When the customer order is ready, the kitchen may transmit a venue service request notification 102 to the transaction scanner 10 via a venue paging system 98B, causing the vibration mechanism 46 to vibrate in a second vibration pattern, alerting the bartender that the customer order is ready to be served to the customer.

Figure 6A:
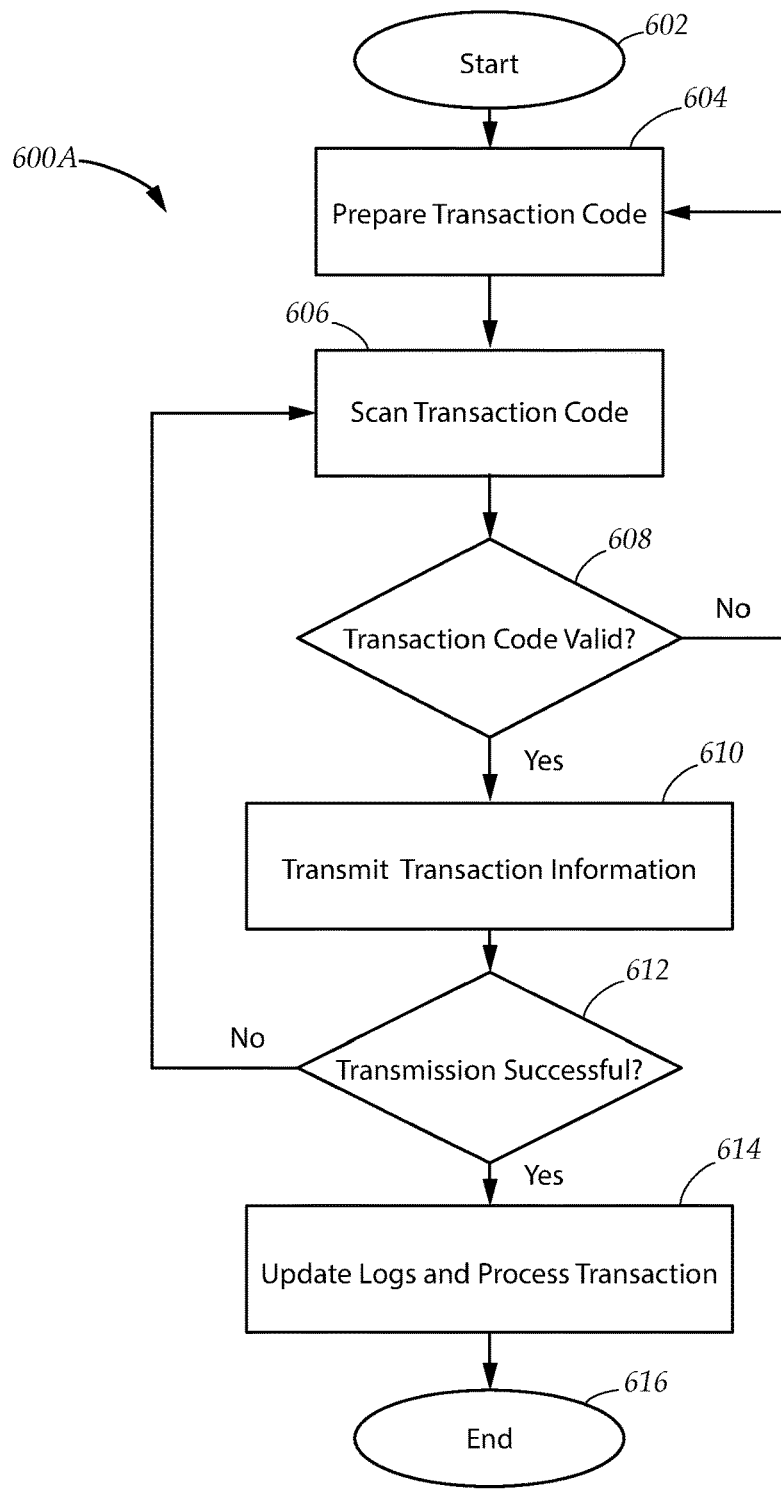
FIG. 6A is a flow chart depicting an exemplary transaction scanning process, in accordance with the present disclosure.

Turning now to FIG. 6A, while referring simultaneously to FIGS. 2 and 5, an exemplary transaction scanning process 600A is shown. The transaction scanning process starts at step 602, when the bartender prepares to take the customer order. The customer presents the bartender with the transaction code 30 at step 604 containing transaction information for a new customer order, and the bartender activates the optical reader 40 and scans the transaction code at step 606. The control unit 61 proceeds to decode the transaction information within the transaction code at step 608. If the transaction code is invalid, the bartender may either re-scan the transaction code at step 606, or prepare a new transaction code at step 604. Once the transaction code 30 is successfully scanned and decoded, the transaction information is transmitted to the POS system 90 at step 610 via a transaction transmission signal. If the transmission information is successfully transmitted, the POS system accepts the order at step 614 and the transaction scanner may further store a record of the transaction information within the transaction log. The bartender may then serve the customer with the ordered items, and the process ends at step 616. If the transmission information is not successfully transmitted, or if the POS system transmits a transaction rejection signal indicating the transaction code is invalid, the bartender may rescan the transaction code at step 606, or alternatively, prepare a new transaction code at step 604. This process 600A may represent a single step transaction scanning process, where the customer order can be completed and the customer served immediately with the ordered items, such as when the customer orders a beer or where the venue 120 employs a "fast food" style ordering system. The customer places the customer order, pays, and then receives the ordered items. As such, payment for the order can be processed immediately at step 614 upon the successful transmission of the order information to the POS system 90. For example, the transaction code 30 may contain encoded payment information, allowing the POS system 90 to process the payment for the order without requiring a second scan. Note that the transaction scanner 10 can be employed with a variety of POS systems, and the particular POS system 90 employed by the food and beverage venue 120 may be configured to process transactions electronically upon receiving the transaction information, or may alternatively present the transaction information for manual processing by a staff member.

Figure 6B:
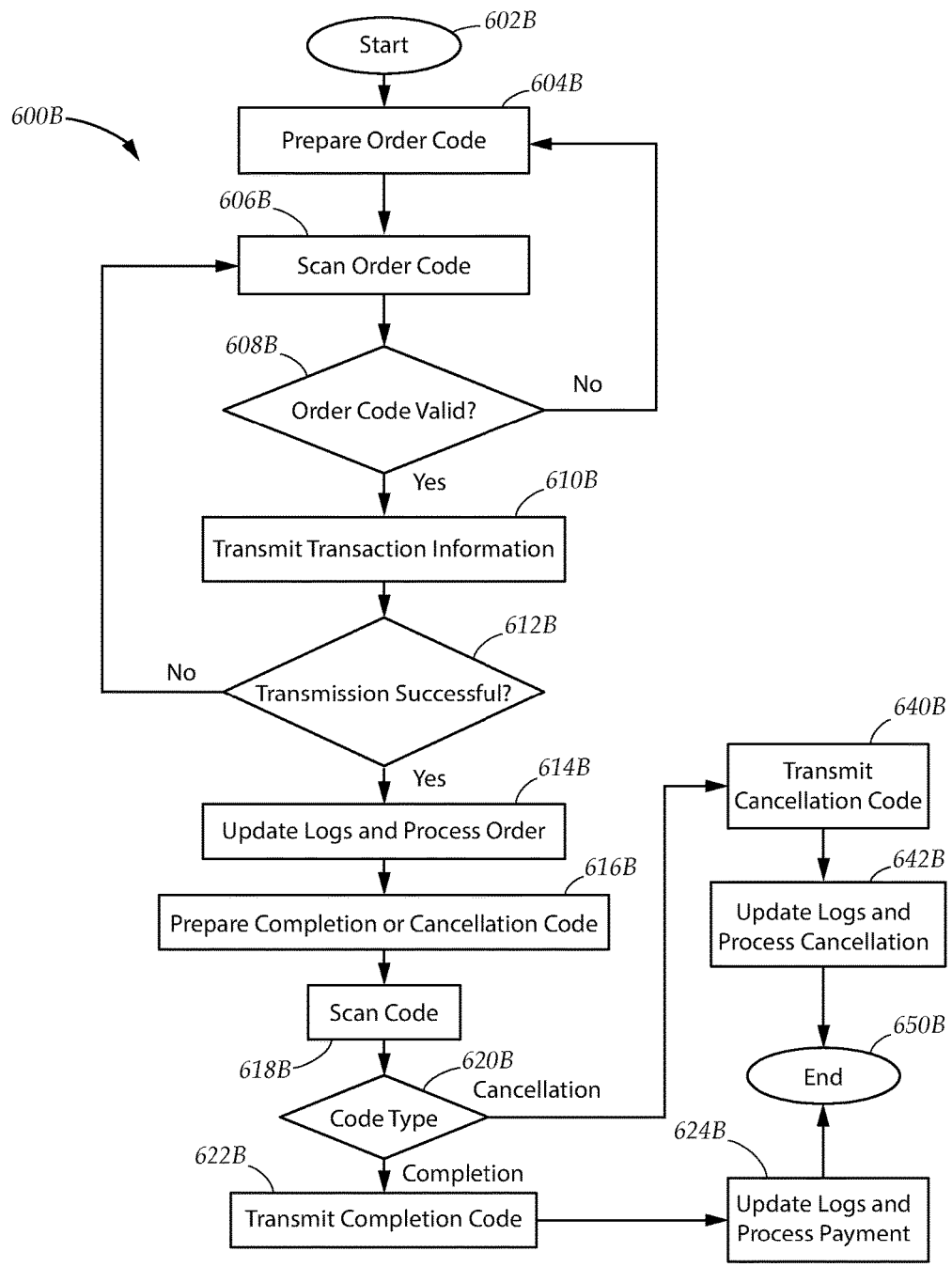
FIG. 6B is a flow chart depicting an exemplary two-step transaction scanning process, in accordance with the present disclosure.

Turning to FIG. 6B, while continuing to refer to FIGS. 5 and 6A, a two-step transaction scanning process 600B is shown. In a food and beverage venue offering table service, the customer normally places an order, receives the ordered items, and submits payment at the conclusion of the meal. The two-step transaction scanning process 600B reflects this and involves the scanning of two transaction codes—the order code, and the completion code. The order code represents the new customer order with transaction information listing the items ordered by the customer, while the completion code contains the customer's payment information and may further identify the customer order for which the payment is to be made. The completion code may also reflect the amount of gratuity which the customer wishes to pay. The completion code may further include a satisfaction rating reflecting the customer's satisfaction with the order and/or service provided by the bartender. The process 600B starts at 602B and substantially mirrors steps 602 through 614 of process 600A, except that at step 604B, the customer presents the bartender with the order code. The order code with its encoded transaction information is then scanned by the bartender at step 606B using the transaction scanner 10, transmitted to the POS system 90 at step 610B, and processed by the food and beverage venue 120 at step 614B. At step 614B, the transaction scanner 10 may also update the transaction log with a record of the transaction information for the customer order.

At the appropriate time, such as at the completion of the meal or at the customer's request, the completion code is prepared at step 616B. It may also be possible to prepare a cancellation code, in case the customer order needs to be cancelled. The cancellation code or completion code is then scanned using the transaction scanner 10 at step 618B. At step 620B, the transaction scanner 10 may determine if the code is a completion code or a cancellation code. If the code is a completion code, the transaction scanner 10 transmits the transaction information encoded within the completion code to the POS system 90 at step 622B. At step 624B, the POS system may then process the payment for the customer order using the payment information within the completion code, and the transaction scanner 10 may further update the transaction log with the transaction information and indicate that the customer order is complete. The two-step transaction scanning process 600B then ends at step 650B.

If the transaction scanner 10 determines at step 620B that cancellation code has been scanned, the transaction scanner 10 will transmit the transaction information encoded within the cancellation code to the POS system 90. The POS system may then process the cancellation at step 642B, and cancel the customer order. The transaction scanner 10 may further update the transaction log with the transaction information of the cancellation code and indicate that the customer order is cancelled. The process 600B then ends at step 650B.

Note that the example processes 600A and 600B are non-limiting, and it will be apparent to a person of ordinary skill in the art in the field of the invention that the individual steps may be varied, skipped, or combined while adhering to the principles of the present disclosure.

Figure 7:
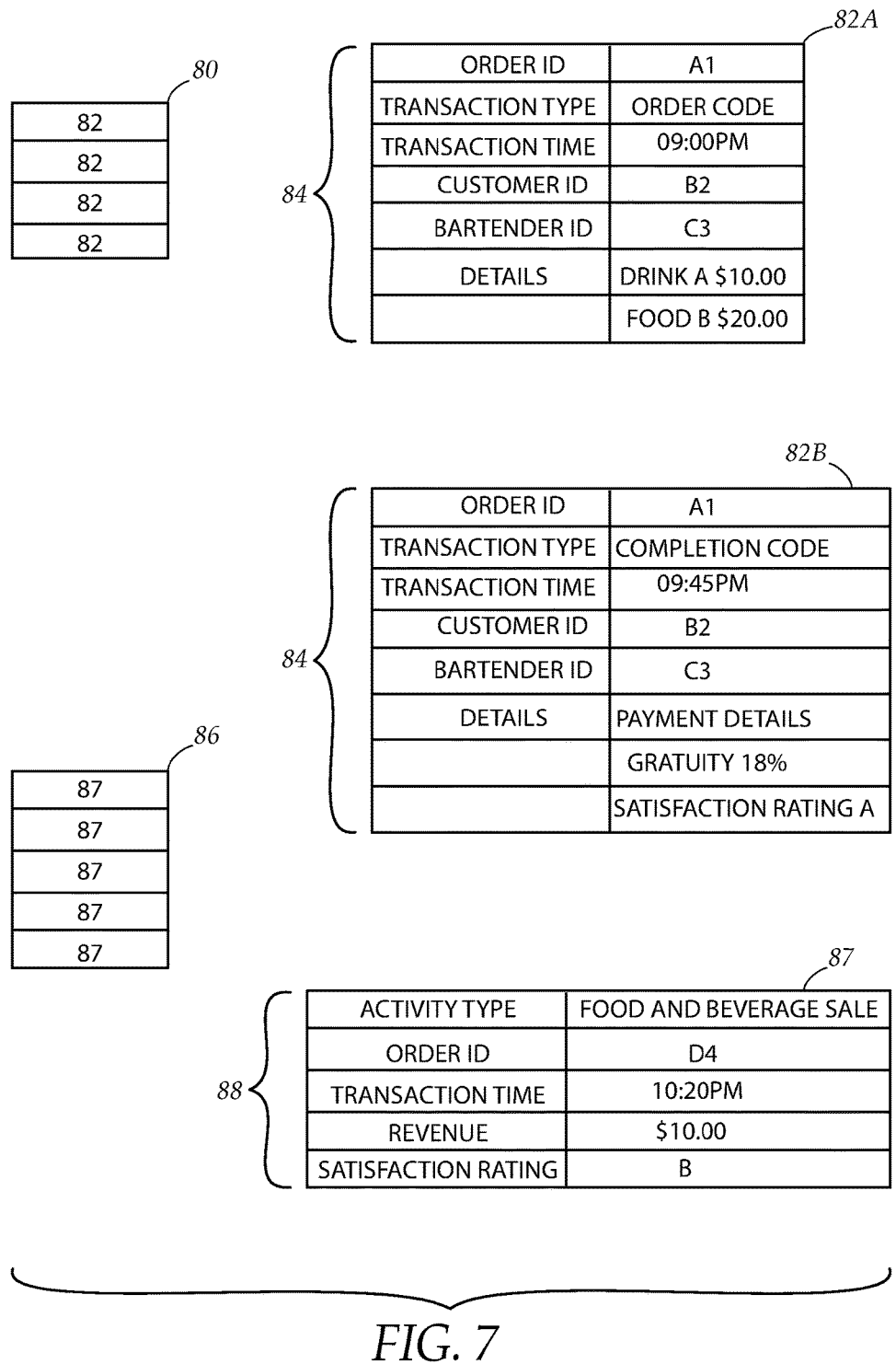
FIG. 7 is a block diagram depicting an exemplary transaction log and an activity log, in accordance with the present disclosure.

Turning now to FIG. 7, while also referring to FIG. 2, the transaction scanner may store the transaction log 80 and/or the activity log 86 within the storage device 65 in a database format, or other file record format as will be apparent to a person of ordinary skill in the art in the field of the invention. The transaction log 80 and activity log 86 may be transmitted to the POS system via the transceiver 67, or may be transferred via the interface port 48. The transaction log 80 and activity log 86 are designed to provide the management of the food and beverage venue with detailed transaction information and activity information to help improve operational efficiency within the venue, and allow for a greater understanding of the performance of individual bartenders as well as the preferences of customers.

The exemplary transaction log 80 contains a list of transaction records 82, with each transaction record 82 recording the details of one transaction code processed by the transaction scanner. Each transaction record 82 may store the transaction information 84 contained within the particular transaction code. For example, the transaction information 84 may comprise an order ID identifying the customer order, the transaction type, a transaction time, the customer ID identifying the customer, the bartender ID identifying the bartender serving the customer, as well as additional detail fields. For example, the transaction record 82A records the scanning of the order code associated with the order ID "A1". The detail fields within the transaction record 82A may contain a list of food and beverage items ordered. The transaction log 80 also contains the transaction record 82B which records the scanning of the completion code associated with the order ID "A1". The detail fields contained within the transaction record 82B may contain the payment details, the amount of gratuity paid by the customer, as well as the satisfaction rating. The exemplary activity log 86 may store a list of activity records 87, with each activity record 87 containing activity information 88 summarizing the details of a particular transaction. For example, the activity log may provide a summary of the bartender's sales and customer satisfaction ratings over a set period of time. Note that the examples provided above are non-limiting, and the actual transaction information recorded within the transaction log 80 will differ depending on the particular POS system employed by the food and beverage venue. The transaction log 80 and activity log 86 together may therefore provide the management of the food and beverage venue with detailed transaction information and activity information to help improve operational efficiency within the venue, and allow for a greater understanding of the performance of individual bartenders as well as the preferences of customers.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a versatile transaction scanner for use in a food and beverage venue. The disclosure is illustrated by example in the drawing figures, and throughout the written description. It should be understood that numerous variations are possible, while adhering to the inventive concept. Such variations are contemplated as being a part of the present disclosure.

What is claimed is:

1. A transaction scanner for use by a bartender or server in a food and beverage venue, the venue employing a point of sale system which is adapted to receive and process a transaction using transaction information, the transaction information being encoded within a transaction code implemented as an optical barcode, comprising:
   an outer shell having a front end and a distally positioned back end, the outer shell further comprising a scanner body positioned towards the front end, and a grip positioned towards the back end, the grip comprising a grip upper surface and a grip lower surface, allowing the transaction scanner to be held by a user, the scanner body further comprising a scanner body upper surface and a scanner body lower surface;

a transaction scanner control unit disposed within the outer shell, comprising a processor, a RAM, a ROM, a communications module having a wireless transceiver adapted to wirelessly communicate with the point of sale system; and a storage device;

an optical reader positioned at the front end of the outer shell and adapted to scan the transaction code;

an activation switch disposed on the grip lower surface which is adapted to activate the optical reader when engaged by the user;

a status light disposed on the scanner body upper surface which is capable of being lit in at least one color;

a vibration mechanism disposed within the outer shell;

a bottle opening mechanism disposed on the scanner body lower surface and adapted to remove a bottle cap from a bottle;

wherein the transaction scanner control unit is adapted to:
receive and decode the transaction information encoded within the transaction code via the optical scanner;
transmit the transaction information to the point of sale system via a transaction transmission signal;
display a status indicator to the user via the status light, the status indicator comprising a pattern of light and color representing the success or failure of the transmission of the transaction information to the point of sale system; and
cause the vibration mechanism to vibrate in response to receiving a service request notification transmitted wireless by the point of sale system; and
wherein the bottle opening mechanism allows the user to scan the transaction code while using the transaction scanner to remove the bottle cap from the bottle.

2. The transaction scanner of claim 1, wherein the transaction scanner control unit is further adapted to receive a transaction rejection signal from the point of sale system indicating the unsuccessful transmission of transaction information to the point of sale system.

3. The transaction scanner of claim 2, wherein the vibration mechanism is disposed within the grip.

4. The transaction scanner of claim 3, wherein the status light further comprises a first status light and a second status light, wherein the first status light displays a scanning status indicator to the user signifying whether the transaction code is successfully scanned by the optical reader and decoded by the transaction scanner control unit, and wherein the second status light displays a transmission status indicator representing the success or failure of the transmission of the transaction information to the point of sale system.

5. The transaction scanner of claim 4, wherein the transaction scanner control unit contains a user ID which identifies the user; wherein the transaction scanner records the user ID within the transaction information of each transaction code scanned by the transaction scanner.

6. The transaction scanner of claim 5, wherein the transaction scanner control unit records the transaction information of each transaction code scanned by the transaction scanner within a transaction log stored within the storage device.

7. The transaction scanner of claim 6, wherein the transaction scanner control unit stores an activity log within the storage device comprising a record of the user's transactions and a customer satisfaction rating for each transaction.

8. The transaction scanner of claim 7, wherein the activation switch is disposed on the grip upper surface and is engaged via the user's thumb.

9. The transaction scanner of claim 8, further comprising an attachment clip disposed on the outer shell which secures the transaction scanner to the user's clothing when the transaction scanner is not in use.

10. A method of processing a transaction whereby a customer purchases a beverage in a food and beverage venue, the venue employing a point of sale system which is adapted to receive and process the transaction using transaction information, the transaction information being encoded within a transaction code implemented as an optical barcode, the method comprising the steps of:

providing a bartender with transaction scanner adapted to be held in the bartender's hand, comprising an optical reader adapted to scan the transaction code, a transaction scanner control unit adapted to decode the transaction information within the transaction code, and a communications module having a wireless transceiver adapted to transmit the transaction information, wherein the transaction scanner further comprises a bottle opening mechanism adapted to remove a bottle cap from a beverage bottle;

presenting the transaction code, wherein the customer presents the bartender with the transaction code, wherein the transaction information within the transaction code identifies the beverage and further contains payment information;

scanning the transaction code, wherein the bartender activates the transaction scanner and scans the transaction code using the optical reader, wherein the transaction scanner control unit decodes the transaction information within the transaction code;

transmitting the transaction information, wherein the transaction scanner transmits the transaction information to the point of sale system via a transaction transmission signal;

processing the transaction, wherein the point of sale system processes the transaction using the payment information;

serving the beverage, wherein the bartender removes the bottle cap from the beverage bottle using the transaction scanner and serves the beverage to the customer.

11. The method of claim 10, wherein the transaction scanner further contains a bartender ID which identifies the bartender; wherein the transaction scanner records the bartender ID within the transaction information of each transaction code scanned by the transaction scanner.

12. The method of claim 11, wherein the transaction scanner further comprises a first status light and a second status light, wherein the method further comprises the steps of:

displaying a scan error light pattern using the first status light when the transaction scanner fails to successfully read the transaction code; and displaying a transmission error light pattern using the second status light when the transaction scanner fails to successfully transmit the transaction information to the point of sale system.

13. The method of claim 12, wherein the transaction scanner control unit further comprises a storage device, wherein the method further comprises the step of recording a transaction log within the storage device containing the transaction information of each transaction code scanned by the transaction scanner.

14. The method of claim 13, further comprising the step of recording an activity log within the storage device comprising a record of the user's transactions and a customer satisfaction rating for each such transaction.

15. A method of processing a customer's order in a food and beverage venue, the venue employing a point of sale system which is adapted to receive and process transaction information or payment information encoded within an order code and a completion code, wherein the order code and the completion code are implemented as optical barcodes, the method comprising the steps of:
provi ding a user with transaction scanner adapted to be held in the user's hand, comprising an optical reader adapted to scan the order code and the completion code, a transaction scanner control unit adapted to decode the transaction information within the order code and the completion code, a communications module having a wireless transceiver adapted to transmit the transaction information, and a vibration mechanism, wherein the transaction scanner further comprises a bottle opening mechanism adapted to remove a bottle cap from a beverage bottle;
initiating a new customer order, wherein the customer presents the user with the order code containing transaction information identifying the food and beverage items ordered by the customer;
scanning the order code, wherein the user activates the transaction scanner and scans the order code using the optical reader, wherein the transaction scanner control unit decodes the transaction information within the order code;
transmitting the order code transaction information, wherein the transaction scanner transmits the transaction information to the point of sale system via a transaction transmission signal;
processing the customer order, wherein the point of sale system processes the customer order, and the venue prepares the items ordered by the customer;
transmitting a service request notification to the user, causing the vibration mechanism to vibrate and alerting the user that the items ordered by the customer are ready to be served;
serving the items to the customer;
presenting the completion code, wherein the customer presents the user with the completion code containing the customer's payment information;
scanning the completion code, wherein the user activates the transaction scanner and scans the completion code using the optical reader, wherein the transaction scanner control unit decodes the payment information within the completion code;
transmitting the completion code, wherein the transaction scanner transmits the payment information to the point of sale system via a transaction transmission signal; and
processing the payment information, wherein the point of sale system processes the customer's payment information, allowing the customer to pay for the customer order.

16. The method of claim 15, wherein the transaction scanner further contains a user ID which identifies the user; wherein the transaction scanner records the user ID within the transaction information of each optical barcode scanned by the transaction scanner.

17. The method of claim 16, wherein the transaction scanner further comprises a first status light and a second status light, wherein the method further comprises the steps of:
displaying a scan error light pattern using the first status light when the transaction scanner fails to successfully read the optical barcode; and
displaying a transmission error light pattern using the second status light when the transaction scanner fails to successfully transmit the transaction information or the payment information to the point of sale system.

18. The method of claim 17, wherein the transaction scanner control unit further comprises a storage device, wherein the method further comprises the step of recording a transaction log within the storage device containing the transaction information or payment information of each optical barcode scanned by the transaction scanner.

19. The method of claim 18, further comprising the step of recording an activity log within the storage device comprising a record of the customer orders associated with the user and a customer satisfaction rating for each such customer order.

* * * * *